United States Patent
Garcia et al.

(10) Patent No.: US 8,767,960 B2
(45) Date of Patent: Jul. 1, 2014

(54) SYSTEM AND METHOD FOR SELF-DECAYING DIGITAL MEDIA FILES AND FOR VALIDATED PLAYBACK OF SAME

(75) Inventors: Ryan M. Garcia, Austin, TX (US); Anthony E. Peterman, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 34 days.

(21) Appl. No.: 13/452,072

(22) Filed: Apr. 20, 2012

(65) Prior Publication Data

US 2012/0203863 A1    Aug. 9, 2012

Related U.S. Application Data

(62) Division of application No. 11/412,200, filed on Apr. 26, 2006, now Pat. No. 8,180,050.

(51) Int. Cl.
*G06F 21/00* (2013.01)
*H04N 21/835* (2011.01)
*H04N 21/235* (2011.01)
*H04N 21/84* (2011.01)
*H04N 7/167* (2011.01)

(52) U.S. Cl.
CPC ......... *H04N 21/835* (2013.01); *H04N 21/2353* (2013.01); *H04N 21/8402* (2013.01); *H04N 7/1675* (2013.01)
USPC ................ 380/200; 380/201; 726/25; 726/26

(58) Field of Classification Search
USPC ......................................................... 380/201
See application file for complete search history.

(56) References Cited

U.S. PATENT DOCUMENTS

| | | | |
|---|---|---|---|
| 5,377,269 A * | 12/1994 | Heptig et al. | 726/20 |
| 6,832,224 B2 | 12/2004 | Gilmour | |
| 6,950,602 B1 | 9/2005 | Terada | |
| 6,963,859 B2 | 11/2005 | Stefik et al. | |
| 7,088,823 B2 * | 8/2006 | Fetkovich | 380/255 |
| 7,174,392 B2 | 2/2007 | Tervo | |
| 7,890,587 B1 * | 2/2011 | Chebiyyam | 709/206 |
| 2002/0104004 A1 | 8/2002 | Couillard | |
| 2003/0069854 A1 | 4/2003 | Hsu et al. | |
| 2003/0145215 A1 | 7/2003 | Dohi | |

(Continued)

OTHER PUBLICATIONS

Abraham et al, Transaction Security System, 1991, IEEE, pp. 206-229.*

(Continued)

*Primary Examiner* — Bradley Holder
*Assistant Examiner* — Brian Olion
(74) *Attorney, Agent, or Firm* — Terrile, Cannatti, Chambers & Holland, LLP; Robert W. Holland

(57) ABSTRACT

Information, such as audio visual information, is secured by self-decay of the information over time. For instance, a date stamp and decay rate embedded in an encrypted audio or visual digital media file can be applied to decrypt the file to a predetermined decayed state, such as a degraded playback quality. One or more keys can be included with the information to allow undecayed decryption but expire after use or a predetermined time period. In one embodiment, the decayed state can comprise gaps formed at intervals in the information, the gaps having increased length for decreased quality. In an alternative embodiment, the decayed state can be a reduced sample rate for a compressed digital media file.

19 Claims, 4 Drawing Sheets

(56) References Cited

U.S. PATENT DOCUMENTS

| | | |
|---|---|---|
| 2005/0129231 A1 | 6/2005 | Kelley et al. |
| 2005/0195978 A1 | 9/2005 | Babic et al. |
| 2005/0204130 A1* | 9/2005 | Harris .......................... 713/165 |
| 2005/0265547 A1 | 12/2005 | Strasser et al. |
| 2006/0008256 A1* | 1/2006 | Khedouri et al. ............. 386/124 |
| 2006/0079217 A1 | 4/2006 | Harris |
| 2006/0115083 A1 | 6/2006 | Candelore et al. |
| 2006/0117379 A1 | 6/2006 | Bennett et al. |
| 2006/0137016 A1 | 6/2006 | Margalit et al. |
| 2008/0025507 A1 | 1/2008 | Taylor |

OTHER PUBLICATIONS

Han et al, Tamper Detection in the EPC Network Using Digital Watermarking, Oct. 2011, IEEE, pp. 62-69.*

U.S. Appl. No. 60/714,102.

U.S. Appl. No. 60/726,726.

* cited by examiner

SYSTEM AND METHOD FOR SELF-DECAYING DIGITAL MEDIA FILES AND FOR VALIDATED PLAYBACK OF SAME

CROSS-REFERENCE TO RELATED APPLICATIONS

This application is a divisional of application Ser. No. 11/412,200, filed Apr. 26, 2006 now U.S. Pat. No. 8,180,050, entitled "System And Method For Self-Decaying Digital Media Files And For Validated Playback Of Same" naming Ryan M. Garcia and Anthony E. Peterman as inventors, and which is hereby incorporated by reference in its entirety.

BACKGROUND OF THE INVENTION

1. Field of the Invention

The present invention relates in general to the field of information handling system digital media files and digital rights management, and more particularly to a system and method for self-decaying digital media files and for validated playback of such digital media files.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Advances in processing, storage and communications components used to build information handling systems have led to increasing convergence of information handling system and entertainment technologies. Many information handling systems are able to access and play audiovisual information content stored in various analog and digital formats on a variety of storage devices and mediums. For example, an information handling system may include an optical drive that will read and write audiovisual content from and to an optical medium, such as a Compact Disc (CD) or Digital Versatile Disc (DVD). Using such an optical drive. an end user can insert a CD or DVD to listen to audio content through speakers or headphones of the information handling system and to watch visual content through a display associated with the information handling system, such as a liquid crystal display (LCD), or other display, integrated into or externally connected to the information handling systems. Often on such systems, end users are able to copy the audiovisual content from the optical medium and store that content on persistent storage on the information handling system, such as on a hard disk drive, flash memory or other persistent storage devices. By using formats that digitize and compress the audiovisual content, such as the MPEG standards for video information content and the MP3 standard for audio information content, end users are able to store digital media files forming a considerable library of digital media content. There exist a wide variety of technologies that allow users to obtain and store digital media files on and move those files between information handling systems. For example, a number of file sharing applications have made digital media file libraries widely accessible through the Internet. Broadband networking capability has reduced download times for minimal download delays while widespread wireless networking capability, such as residential gateways and retail hot spots, has made access very convenient. There are a growing number of commercial sources for audio and video digital media files that allow users to select, purchase and download digital media files for use on information handling systems. And, end users increasingly store, create, modify, listen to and/or watch audiovisual information in digital media files on a wide variety of devices, including but not limited to consumer electronics devices, digital media systems, personal computer systems, notebooks, cell phones and personal digital media devices.

The ease with which end users can copy, modify and move digital media files has raised concerns about the protection of the intellectual property rights associated with audiovisual information embodied in those files. Content creators, authors and owners recognize that they hold the responsibility not only for distribution of this content but also for establishing any desired protection scheme. As such, intellectual property owners have responded to this concern by attempting to protect audiovisual information with a variety of Digital Rights Management (DRM) platforms that, for example, may provide some control over core functionalities of information handling systems with respect to protected audiovisual file information, such as the ability to transfer or copy a digital media file, the ability to read a file on unlimited devices, the ability to covert a file to a different formats, and related functionalities. Some DRM platforms enforce such restrictions, for example, by wrapping digital media files with levels of security. One difficulty with wrapping files is that, once access to the file is granted, the file may be compromised and the audiovisual content can be transferred to unrestricted formats. Another difficulty is that many DRM platforms typically require at least a one-time Internet interface to a remote system or server prior to allowing access to a protected file and sometimes require this Internet interface for each access of a protected file. This connection requirement limits the usefulness of protected files and generally forces content providers to either release an unprotected file usable on any device or a protected file usable only on a limited number of devices.

SUMMARY OF THE INVENTION

Therefore a need has arisen for a system and method for self-decaying digital media files and for validated playback of such digital media files.

In accordance with the present invention, a system and method are provided which substantially reduce the disadvantages and problems associated with previous methods and systems for securing information content in digital media files. In one embodiment of the present invention, decay information embedded with encrypted information can be used to decrypt the information content to a decayed state. Initially the decayed state allows full use of the information content, however, based upon predetermined factors the decay information brings the information content to a decayed state with limited or no usefulness so that illicit copying of the information is futile.

More specifically, in one embodiment, an audiovisual digital media file having a payload, such as a compressed movie or compressed music, can have embedded decay information that decays the file over time or with usage. An application running on an information handling system applies the decay information to decrypt the audiovisual file to a decayed state for use by a playback module. For instance, the decay information can comprise a time stamp key and a decay rate key. A decryption module may determine a current time from the information handling system, determine a delta time between the time stamp and the current time, and apply the decay rate to the delta time to determine which portions of the audiovisual digital media file to decrypt. As another aspect, gaps having an interval and a length can be inserted in the audiovisual file. The decryption module can detect the gaps and increase the gap by a predetermined amount, such as doubling the gap at each decryption. As another embodiment, the decay information can include an offset number that defines an offset of blocks of the file that are not decrypted. The decryption module can increase the offsets in a predetermined manner, such as by decreasing the sample rate of compressed audio or video information. In one alternative embodiment, a key server can provide the application with keys to allow decryption of the file in an undecayed state for a predetermined time or number of uses.

The present invention provides a number of important technical advantages. One example of an important technical advantage is that information content in digital media file can be encrypted with self-contained keys that prevent illicit copying of the information without network monitoring by eliminating any usefulness of copied files. Attempts by an end user to provide copies of the information illicitly to others will, at worst, forward a copy that self-decays. Self-decay can completely delete a file or can leave a low quality file that allows recognition of the content with minimal practical use. Thus, for instance, playback of an audio file of a song may provide enough audible sound for an end user to recognize the song so that the end user can retrieve additional rights if desired, such as through a network base key. However, without taking such action, playback of the song can be degraded to a point of little usefulness.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

According to one embodiment, self-decay of information content embodied in digital media files used by an information handling system, such as audio content files or audiovisual content files, can provide embedded security to reduce usefulness of illicit copying of the information content. A Protected Gamut by Decaying (PGD) file format allows distribution of content with embedded decay information to restrict illicit copying. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
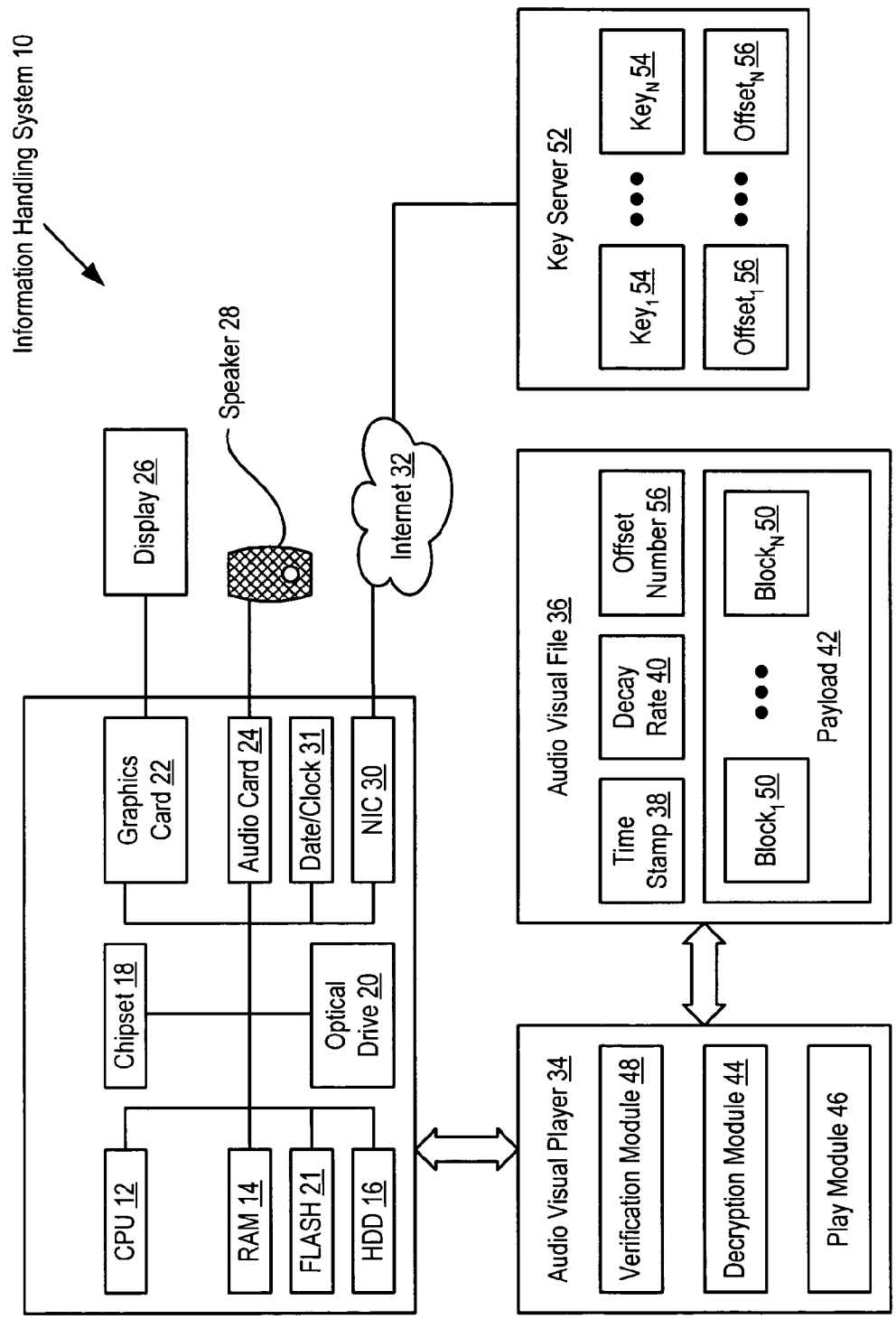
FIG. 1 depicts a block diagram of one embodiment of an information handling system for self-decaying digital media files and for validating playback of such files.

Referring now to FIG. 1, a block diagram depicts one embodiment of an information handling system for self-decaying digital media files and for validating playback of such files. An information handling system, indicated generally at 10, may process information content for presentation to an end user through the cooperation of plural processing components, such as a CPU 12, RAM 14, a hard disk drive 16, a chipset 18, an optical drive 20, a flash memory storage 21, a graphics card 22 and an audio card 24. As an example, audiovisual information stored in digital media files on hard disk drive 16, on flash memory storage 21, or on an optical medium associated with optical drive 20 can be processed from a compressed format by CPU 12 for presentation. Visual information is communicated to graphics card 22 for presentation as visual images at a display 26, and audio information is communicated to audio card 24 for presentation as audio sound at a speaker 28. A network interface card 30 interfaces with a external network, such as a local area, wide area, wireless or other network, and provides access to the Internet 32, for example, to support the download of audiovisual digital media files from external sources. Information handling system 10 may also contain a system date/clock device 33 for storing a current date and time representing an actual date and time for the end user. Further, a persistent storage device such as for example hard disk drive 16 typically stores a variety of files and data in addition to digital media files—including operating system files, application files, network access and internet log files, and boot log files. These files can have dates associated with them identifying, for example, when the files were created, last accessed and last modified. Further, dates associated with many of these files are updated automatically during operation of information handling system 10 based upon a date and time stored in the system date/clock device 33 or provided by an accessed network device or Internet device.

Figure 3:
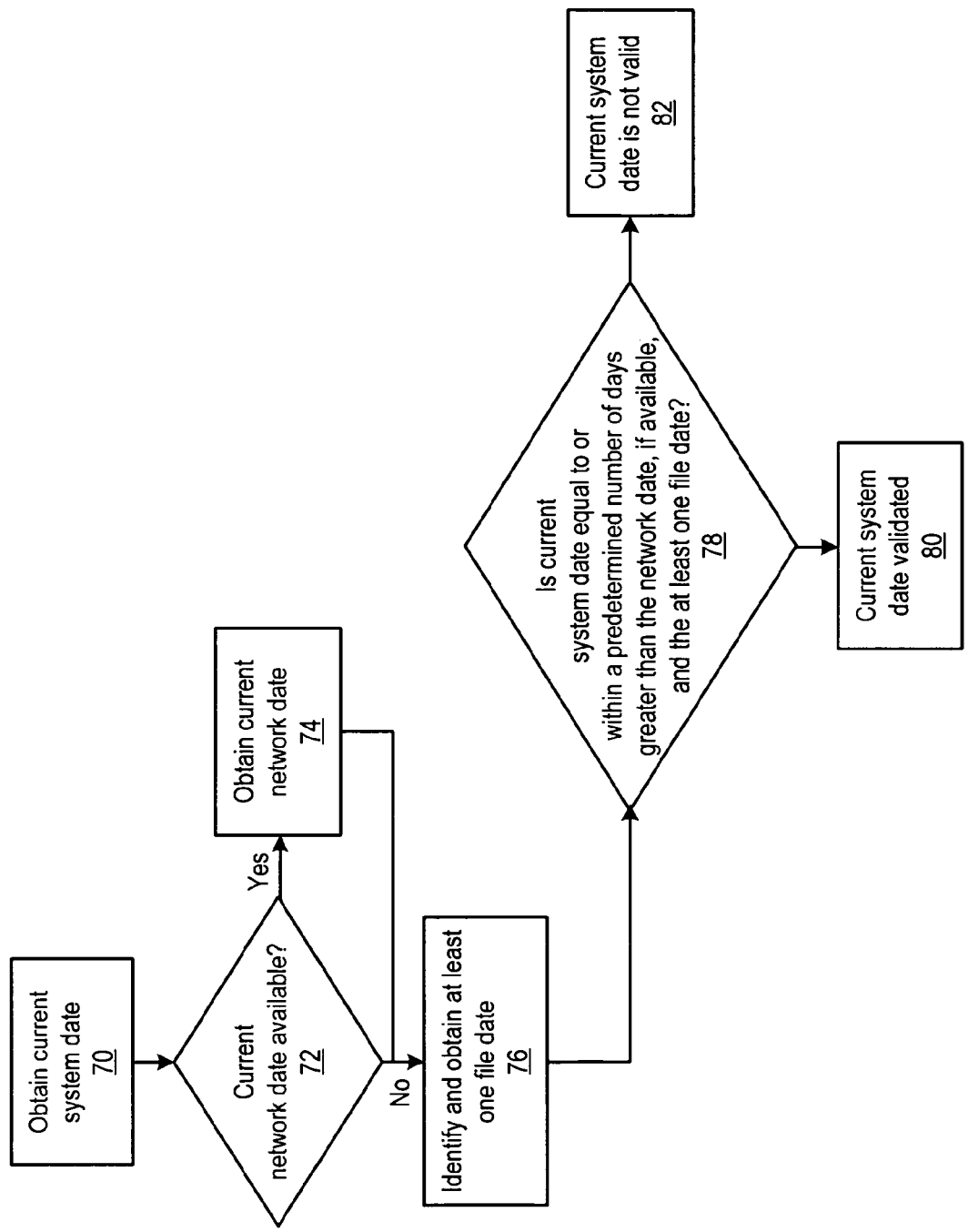
FIG. 3 depicts a flow diagram of one embodiment of a method for validating a current date for use in playback of a digital media files.

An audiovisual player 34 runs as an application on the processing components of information handling system 10 to present audiovisual information from audiovisual digital media files 36. According to this embodiment, digital media file 36 includes two embedded encryption keys—a time stamp 38 and a decay rate 40—which protect a payload 42, such as a compressed movie content or a compressed audio content. A decryption module 44 applies the time stamp 38 and decay rate 40 to decrypt payload 42 so that a play module 46 can present the information content of payload 42 for listening and/or viewing by the end user. Decryption module 44 decrypts payload 42 to a decayed state based upon the difference between time stamp 38 and a current time retrieved from information handling system 10. The difference in time is, for example, multiplied by decay rate 46 to determine what portion of payload 42 is decrypted and what portion is decayed. A large decay rate creates a high rate of decay to allow content providers to ensure that payload 42 remains usable for a short period of time while a low decay rate allows payload 42 to remain usable for a longer period of time. Decay rate 46 can have a linear relationship over time or can use an exponential or other relationship that provides a period of low decay followed by a period of rapid decay. Decryption module 44 does not decrypt the decayed portion of payload 42 or, alternatively, can delete the decayed portion. A verification module 48 verifies that the current time provided by information handling system 10 is accurate. For instance, a number of date sources can be compared against the current date set in the information handling system 10 so that the current time can be validated or so that a disparity can indicate an inaccurate current date which can be used to end decryption of payload 42. FIG. 3 and the accompanying description below provide one embodiment of a method that can be used by verification module 48.

A variety of techniques are used to decay payload 42, either without a network connection based on self-contained decay or with a network connection. In one embodiment, payload 42 is divided in blocks 50 which are associated with two or more levels of quality. For example, audio information is divided into a set of blocks 50 that provide playback at a lower quality 32 KHz sample rate and another set of blocks 50 that provide playback at a higher quality sample rate, such as 128 KHz. Decryption module 44 decrypts the low quality audio without a key while decryption of the high quality audio requires the download from a key server 52 of keys 54. Keys 54 expire upon use or after a defined time to disable decryption of high quality audio, however, the low quality audio remains decryptable so that the end user can listen to low quality audio before downloading additional keys 54. In an alternative embodiment, keys 54 are bundled within audiovisual file 36 and expired over time or usage by audiovisual player 34. In this embodiment, keys bundled with audiovisual file 36 are tied to audiovisual player 34 of information handling system 10 to prevent copying to other systems. In addition, the presence of time stamp 38 and decay rate 40 prevent attempts to illicitly copy payload 42. Time stamp 38 is, for instance, reset at each download of additional keys 54.

An alternate embodiment decays payload 42 by skipping portions of payload 42 or creating gaps as payload 42 is decrypted. For example, an offset number 56 embedded in audiovisual file 36 determines how many blocks 50 are decrypted and how many are skipped. Audiovisual file 36 is distributed with a relatively high offset number embedded in it to allow low quality play, such as to provide for recognition of the payload but not enjoyment. Information handling system 10 retrieves keys 54 and offsets 56 from key server 52 to allow for higher quality play, such as an offset of zero. The offset value increases over time or with usage until another key 54 and offset 56 are downloaded. As an alternative to the use of offset values, decryption module 44 creates offsets by including gaps in the decrypted information. For example, payload 42 is distributed with gaps of a defined length and occurring at a defined interval, such as gap of $\frac{1}{128,000}$ of a second occurring every three seconds. Each time the decryption module 44 decrypts payload 42, each gap is increase by a defined factor, such as double the current value. Thus, after twenty iterations the gaps increase to greater than the three second interval so that the file becomes blank, although the degradation in the quality of the file will become apparent before the file is blank. An initial registration of the file with audiovisual player 34 prevents an attempt by the end user to replay the initial file.

Figure 2:
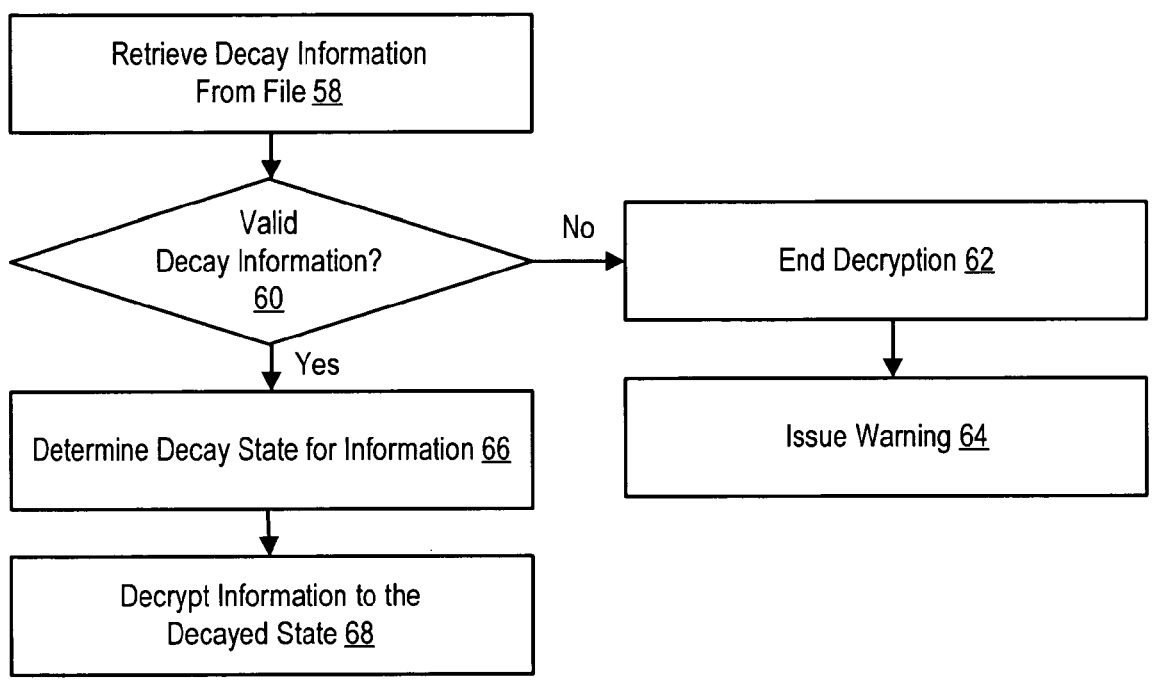
FIG. 2 depicts a flow diagram of one embodiment of a method for securing information through self-decay of a digital media file.

Referring now to FIG. 2, a flow diagram depicts one embodiment of a process for securing information through self-decay of a digital media file. The process begins at step 58 with retrieval of decay information, such as a time stamp and decay rate, from an audio or audiovisual digital media file. At step 60, a determination is made of whether the decay information is valid. For instance, the decay information can be a time stamp from the file, a decay rate from the file and a current time from an information handling system clock. As another example, the decay information can be a gap interval and length or an offset. The validity of the current time can be checked by reading date stamps from the information handling system and comparing the date stamps with the current date to ensure that an excessive disparity does not exist. FIG. 3 and the accompanying description below provide one embodiment of a method that can be used for such date validation. The validity of the gap or offset information can be confirmed by checking for the presence of a key or by checking for an appropriate registration on the information handling system with a count of the current number of plays of the information or remaining time for plays of the information. If the decay information is invalid, the process continues to step 62 to end the decryption of the information and ends at step 64 by issuing a warning that information security has been tampered with.

If at step 60 the decay information is valid, the process continues to step 66 to determine the decay state for the information. For instance, a delta between the current time and the time stamp is multiplied by a decay rate to determine the portion of the information to be decrypted. As another example, the gap length or offset is determined based on the initial gap length or initial offset and the number of plays of the information. Once the decay state is determined at step 66, the process continues to step 68 at which the information is decrypted to the predetermined decayed state. For instance, the information is decrypted to a predetermined sample rate quality. As another example, the information is decrypted to have a predetermined gap length at given intervals or to have predetermined blocks left encrypted. Alternatively, if an appropriate key is found, the information is decrypted completely. Once decrypted, the information is provided to the information handling system for play back and presentation to the end user.

FIG. 3 depicts a flow diagram of one embodiment of a method for validating a current date for use in playback of a digital media files. As shown, in step 70, a current system date stored on the information handling system is obtained. Such a current system date may be stored for example on a date/clock device as shown with regard to FIG. 1. Unfortunately, such a current system date needs to be validated before use given end users are often allowed to change this to any desired setting. Without validation, the current system date may not in reality match the actual real world date of the end user. According to this embodiment, the method uses dates from other sources that are updated during normal operation of the information handling system.

Following step 70, it is determined in step 72 whether a current network date is available and, if so, that date is obtained in step 74. Such a network date may be available, for example, from network or internet access log files or from a connected network device such as a network router or gateway. Whether or not a current network date is obtained, the method continues at step 76 with identifying and obtaining a file date from at least one file stored on the information handling system. In this embodiment, the file date can be obtained from a number of sources including a boot log file, and operating system log file, an operating system swap file and a latest file modification date present in the file system.

In step 78, the current system date is compared to the current network date, if available, and to the at least one file date. And, it is determined whether the current system date is equal to or within a predetermined number of days greater than those dates. If so, then in step 80, the current system date is validated as representing an actual current date. If not, then in step 82, the current system date is considered not valid. This process of comparing the current system date against other dates provides an acceptable level of assurance that the end user has not, for example, modified the current system date in order to trick the system into full playback of digital media files. It may be technically possible, given perfect and careful monitoring of file and date activity, for an end user to change the current system clock so that all compared dates allow validation to occur. However, that is difficult enough to achieve that it would only occur in rare situations. For the vast majority of end users, this validation process would ensure that a valid current system date representing the actual date for the end user. And, as such, the validated current system date can successfully be used for use in playback and decay of digital media files as described herein.

Figure 4:
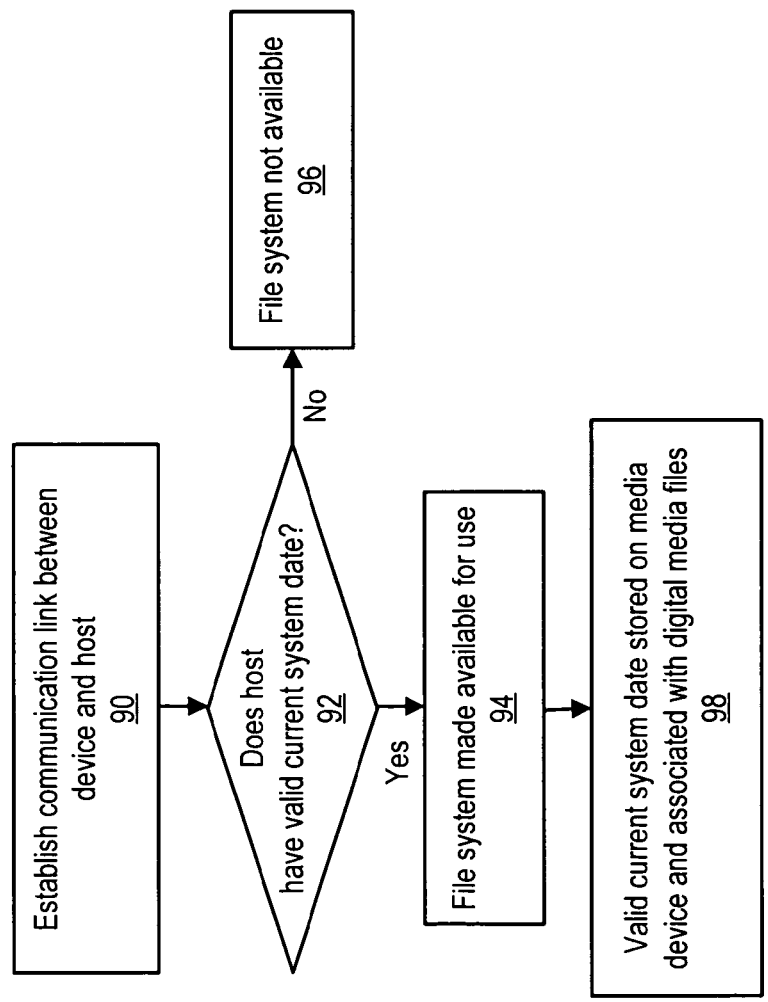
FIG. 4 depicts a flow diagram of one embodiment of a method for validating playback of digital media files on a stand alone media player device.

FIG. 4 depicts a flow diagram of one embodiment of a method for validating playback of digital media files on a stand alone media player device. In some configurations used by end users, a stand alone media player device is used for listening to and/or watching information content from digital media files. These devices are often relatively small and portable, and use a flash memory device or small hard drive storage for storing the digital media files. In order to move digital media files onto such a device, end users connect such devices to a host information handling system and move files from the host to the stand alone player device.

According to the embodiment of FIG. 4, in step 90, a communication link can be established between the media player device and the host information handling system. This connection can be via a USB, IEEE 1394 or other appropriate communication connection. In step 92, it is verified that the host system has a valid current system date. One method for validation of the current system date is shown in and described with respect to FIG. 3 above. If there is a valid current system date, a file storage of the media player device is allowed in step 94 to be available for reading or writing of digital media files. As mentioned above, such file storage may utilize a flash memory device a small hard drive or other appropriate persistent storage device. If the host does not have a valid current system date, then the file storage in step 96 is not made available.

Once the file system on the media device is made available, then in step 98, the valid current system date is stored on the media player device and associated with digital media files stored on the media player device. This valid current system date represents the actual date for the end user at the time of communication with the host information handling system. Provided that an end user connects to the host on a reasonably frequent basis, this stored current system date will closely represent the actual date. And, the stored current system date can be used for the playback and decay of digital media files as described herein.

Although the present invention has been described in detail, it should be understood that various changes, substitutions and alterations can be made hereto without departing from the spirit and scope of the invention as defined by the appended claims.

What is claimed is:

1. A method for validating a current date from an information handling system, the method comprising:
   obtaining a current system date stored on the information handling system;
   determining whether a current network date is available and obtaining the current network date if available;
   identifying a file date from at least one file stored on the information handling system and obtaining the at least one file date;
   wherein the file stored on the information handling system is an operating system swap file;
   comparing the current system date, the current network date if available, and the at least one file date; and
   validating the current system date as representing an actual current date if the current system date is equal to or within a predetermined number of days greater than the current network date if available and the at least one file date.

2. The method of claim 1 further comprising using the validated current system date for decaying information content of a digital media file.

3. The method of claim 1 wherein identifying a file date from at least one file stored on the information handling system and obtaining the at least one file date further comprises identifying the file date from at least a boot log file stored on the information handling system and obtaining the boot log file date.

4. The method of claim 1 wherein identifying a file date from at least one file stored on the information handling system and obtaining the at least one file date further comprises identifying the file date from at least a file having a date reflecting a modification of information stored in the file and obtaining the date reflecting the modification.

5. The method of claim 1 wherein identifying a file date from at least one file stored on the information handling system and obtaining the at least one file date further comprises identifying the file date from at least a boot log file and a date reflecting modification of information stored in a file.

6. The method of claim 1 wherein the network date comprises a network access log file.

7. The method of claim 1 wherein the network date comprises a date retrieved from a network gateway.

8. The method of claim 1 wherein the network date comprises a date retrieved from a network router.

9. The method of claim 1 wherein the file date comprises an operating system log file.

10. The method of claim 1 wherein the file date further comprises at least a boot log file date, an operating system log file date, an operating system swap file date and a latest file modification date present in the file system.

11. The method of claim 10 wherein the network date comprises an Internet access log file date.

12. A method for validating playback of digital media files on a stand alone media player device, the method comprising:
    establishing a communication link between a media player device and a host information handling system;
    verifying that the host system has a validated current system date by comparing a current system date of the host system with an operating system swap file date of the host system;

allowing, in response to the verifying, a file storage of the media player device to be available for reading or writing of digital media files; and storing the validated current system date on the media player device and associating the validated current date with digital media files stored on the media player device.

13. The method of claim 12, further comprising using the validated current system date for decaying information content of a digital media file.

14. The method of claim 12 wherein verifying that the host system has a validated current system date further comprises comparing the current system date with plural file dates, the plural file dates including at least a host boot log file date and a date reflecting modification of information stored in a file of the host.

15. The method of claim 14 wherein verifying that the host system has a validated current system date further comprises comparing the current system date with a network access log file date.

16. A method for validating playback of digital media files on a stand alone media player device, the method comprising:

verifying that a host system has a valid current system date by comparing a current system date of the host system with an operating system swap file date of the host system; and in response to the verifying, storing the valid current system date on the media player device and associating the valid current system date with digital media files stored on the stand alone media player device.

17. The method of claim 16, further comprising using the valid current system date at the stand alone media player device for decaying information content of one or more of the digital media files.

18. The method of claim 16 wherein verifying that the host system has a valid current system date further comprises comparing the current system date with plural file dates, the plural file dates including at least a host boot log file date and a date reflecting modification of information stored in a file of the host.

19. The method of claim 16 wherein verifying that the host system has a validated current system date further comprises comparing the current system date with a network access log file date.

* * * * *